UNITED STATES PATENT OFFICE.

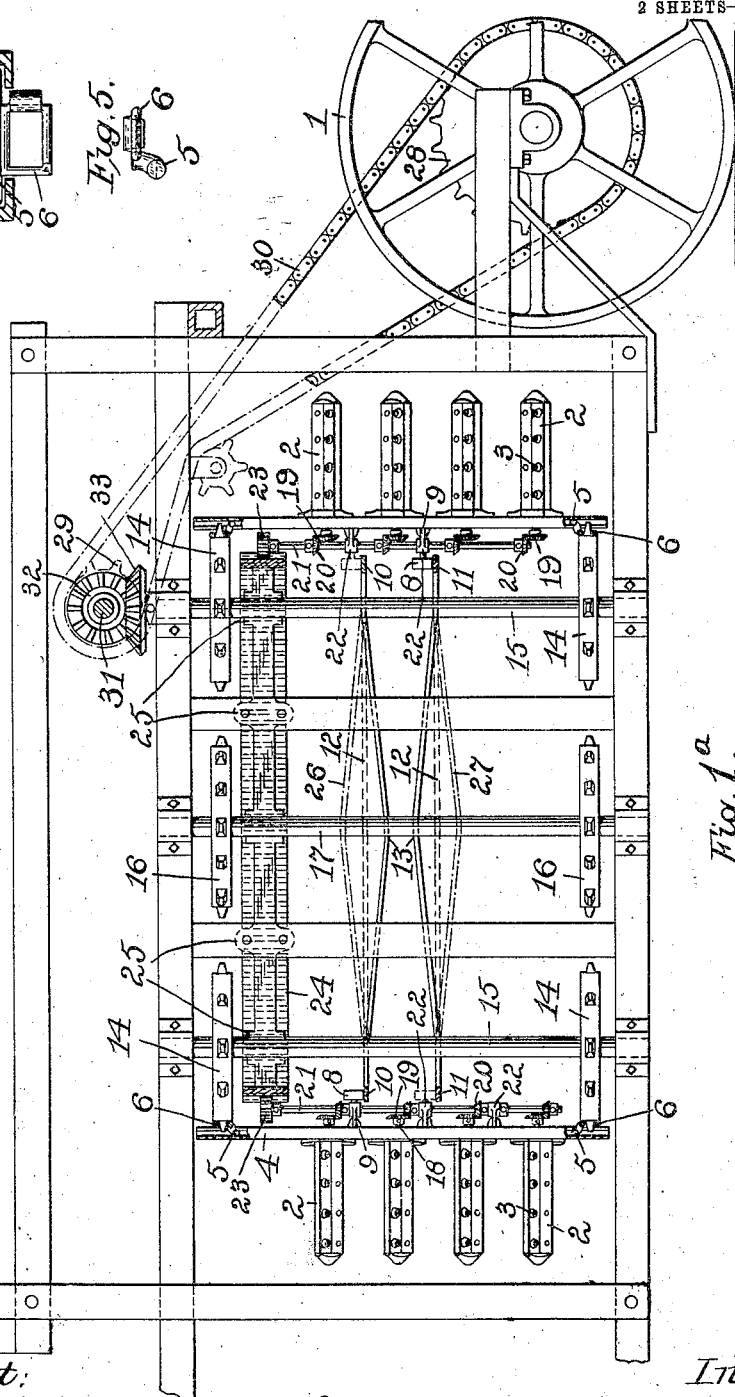

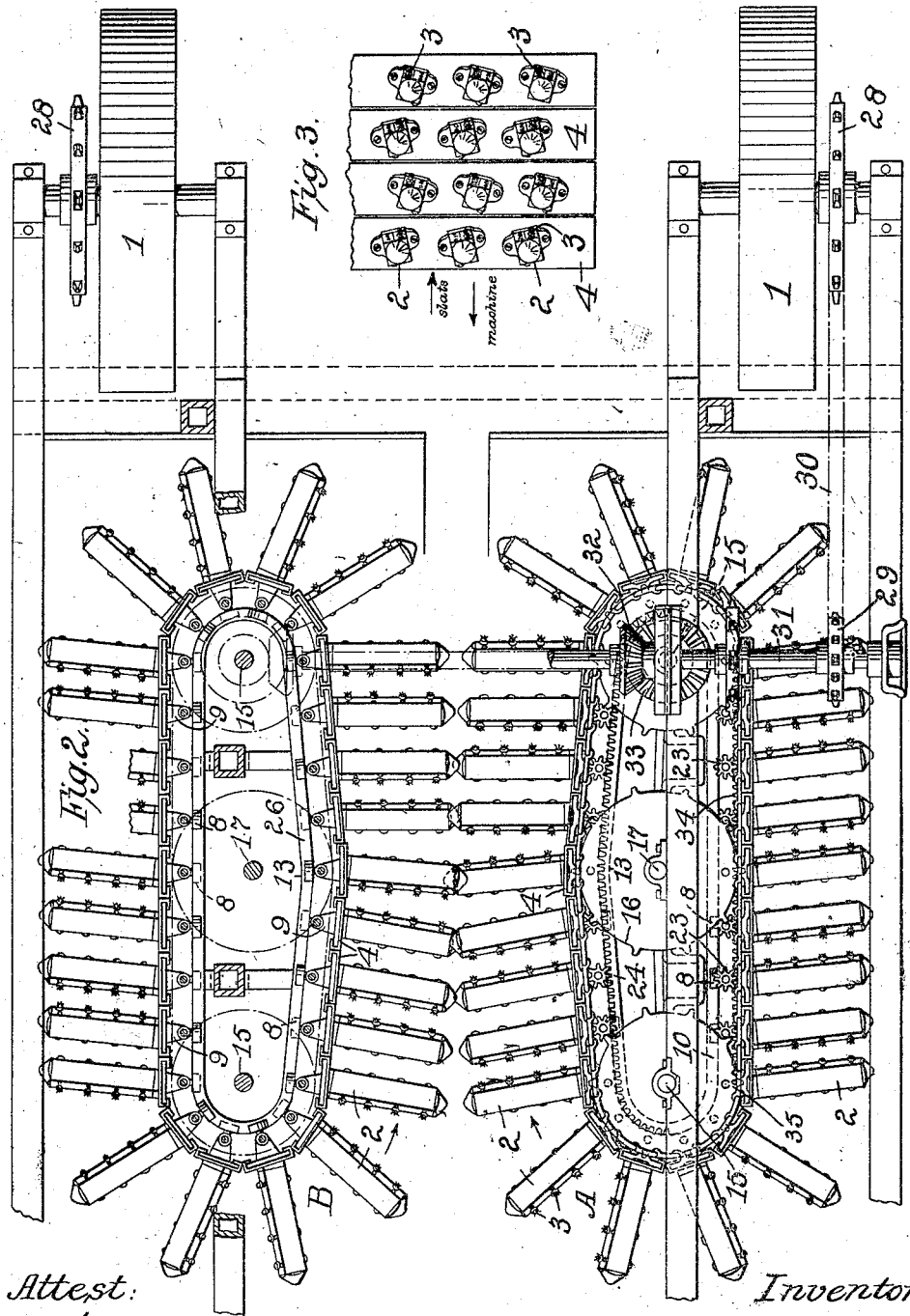

PETER PAUL HARING, OF GOLIAD, TEXAS.

COTTON-PICKING MACHINE.

1,076,573.  Specification of Letters Patent.  Patented Oct. 21, 1913.

Application filed April 12, 1910, Serial No. 555,050. Renewed March 10, 1913. Serial No. 753,422.

*To all whom it may concern:*

Be it known that I, PETER PAUL HARING, a citizen of the United States, residing at Goliad, Texas, have invented certain new and useful Improvements in Cotton-Picking Machines, of which the following is a specification.

My invention relates to cotton pickers of the general form disclosed by me in application for Letters Patent of the United States, filed February 26, 1908, No. 417,986, my present invention being designed to increase the efficiency of the machine while presenting a structure of simple character and one inexpensive to make.

The invention consists in the features of construction and combination and arrangement of parts hereinafter described and particularly pointed out in the claims.

In the accompanying drawings Figure 1 is a side view of a portion of the machine with parts in section and parts omitted; Fig. 1ª is a view of a detail; Fig. 2 is a plan view of a portion of the machine with parts in section and parts omitted; Fig. 3 is a side view of several of the slats belonging to one side of the machine with the picker arms supported thereon; Fig. 4 is a detail view of one of the links of the supporting and operating chains, this view being a side elevation; Fig. 5 is a view looking from the right of Fig. 4.

The frame of the machine may be of any suitable form, being supported by carrying wheels 1 at the rear, the frame being shown as broken away at the front, and the front supporting and carrying wheels being omitted. The picker arms 2 carrying picker spindles 3 are arranged upon slats 4, there being a series of these slats for each side of the machine, and constituting an elongated drum or endless carrier for the picker arms, one of these drums being indicated generally at A for one side of the machine, and the other drum being indicated generally at B for the other side of the machine, these drums being located on opposite sides of the longitudinal center of the machine and upon opposite sides of the space which receives the plants, as the machine is drawn forward, from which the cotton is to be picked by the picker spindles on the picker arms which project transversely of this central longitudinal space. The picker arms are arranged at different elevations, each of the slats carrying a series of said arms disposed vertically one above the other. The arms, as shown in Fig. 2, are set at an inclination to the face of the slats so that they project or incline toward the front of the machine in order to better facilitate their entrance into the plant by what may be termed a "draw cut" action, instead of contacting with the plant, either point forward or in a direction at right angles to the line of draft of the machine. These picker arms are arranged also in different axial positions in relation to the carrying slats, those on one slat being turned into an axial position different from those on the adjacent slat, as shown in Fig. 3, that is to say, the picker arms on the slat at the left of Fig. 3 are turned and set in an axial position to present the picker spindles at an inclination upwardly toward the right, while the picker arms on the next slat are turned and set in an axial position so that their picker spindles are inclined upwardly toward the left, the purpose of this alternate inclination or axial position of the picker arms being to present the picker spindles in such position as to more fully cover the area of the plant. It will be further observed from Fig. 3 that the picker arms on the left hand slat are in a higher plane than those on the adjacent slat at the right, or, in other words, these picker arms are staggered in relation to each other in a horizontal plane to more fully cover the surface of the plant. The slats which carry the picker arms are preferably formed of metal of channeled shape in cross section, and these channels receive cross bars 5 on the links 6 of the carrying and supporting chains, the slats being marked 4. The cross bars are at the lower part of the links of the upper chain, and at the upper part of the links of the lower chain. The slats of channeled form are adapted to have free vertical movement on these cross bars, and for supporting the slats vertically I provide rollers as at 8 journaled on brackets 9 extending inwardly from the channeled side of the slats, and bearing upon tracks 10 and 11, there being a pair of these tracks for each side of the machine. These tracks have horizontal portions 12 at the outer side of the machine, and at the inner side they incline from the end to the central point 13, one of the tracks of the pair at one side inclining upwardly and the other inclining downwardly, as shown in full lines in Fig. 1.

The sprocket chains 6 pass around sprocket wheels 14 carried by vertical shafts 15 at the ends of the drums or carriers, and these sprocket chains also engage a central sprocket wheel 16 on a shaft 17 mounted in suitable bearings in the frame. By these sets of three sprocket wheels the upper and lower chains are supported and guided. The central sprocket wheel is of larger diameter than the end sprockets, and is so placed in relation thereto, as shown in Fig. 2, that the chains on opposite sides of the central longitudinal space converge toward each other from the front to a point midway of the endless drums or carriers, and from this central point the sprocket chains diverge to the rear. This arrangement causes the picker arms to gradually approach each other from opposite sides of the central space as they move toward the rear, and from the time they strike the plant to the time that they arrive at the longitudinal center of the machine they progressively enter the plant, and their converging movement brings them into contact with a larger area of the plant than would be the case were the picker arms moved directly toward the rear in parallel planes.

The rollers 8 resting upon the tracks at 10 and 11 form the sole support vertically for the slats carrying the picker arms, and as these slats are carried from front to rear, one slat will be lifted gradually as the roller runs up the incline of the track, and thus the picker arms will be gradually raised to come into contact with the plant at different elevations, and at the same time the roller on the next following slat on this side of the machine will move down the incline of its track to have a like effect in contacting with different portions of the plant. In these actions, the slats simply move vertically on the cross pins or bars 5 of the chains. The picker spindles are rotated from shafts 18 extending longitudinally of the picker arms, and having at their inner ends bevel gears 19 meshing with bevel gears 20 on vertical shafts 21 carried in bearings 22 supported by the vertical slats. The upper end of these shafts carry pinions 23 meshing with a rack bar 24 suitably supported in fixed position within the drum or carrier, as indicated at 25 in Fig. 1. This rack is of sufficient vertical extent to allow the pinion 23 to slide vertically in the vertical movement of the slat while maintaining its engagement therewith.

I show in dotted lines in Fig. 1 at 26 and 27 the inclined tracks for the far side of the machine, those shown in full lines being for the near side of the machine, illustrated in Fig. 1. These tracks shown in dotted lines are borne upon by rollers similar to those above described for supporting the slats of the drum shown generally at B, and one of these tracks on the inner side of the machine inclines upwardly, while the other inclines downwardly, so that successive slats will have reverse vertical movement, one slat moving upwardly while the next slat moves downwardly on the same side of the machine. From the central point 13 the tracks incline back to the same horizontal plane in which the front ends of the tracks lie, so that after passing the center, those slats which have been moved upwardly will again move downwardly into the same horizontal plane from which they started their vertical movement, and those which moved downwardly in passing from the front will be returned upwardly. The arrangement is such in respect to the picker arms, the supporting rollers and the inclined tracks that the picker arm on one side of the machine will slightly overlap that at the other side of the machine, as shown in Fig. 2, when these opposing picker arms arrive midway of their course to the rear.

For the picker spindles of successive slats, I arrange the gear connections so that the picker spindles of one slat will turn in one direction, and those of the next slat will turn in the opposite direction, and this arrangement of gearing is illustrated at the right and left ends of the drum shown in Fig. 1, the gears on the vertical shaft in the one case meshing with the upper side of the gears on the shafts of the picker arms, while in the next slat this arrangement of gearing is reversed, the gear on the vertical shaft meshing with the lower portion of the gear on the shaft of the picker arm.

The machine is driven from the rear carrying wheels through sprocket wheels and chains indicated at 28, 29 and 30, and I preferably use one of these sprocket chains for each side of the machine. The sprocket wheels 29 are on a cross shaft 31, and suitable clutches may be employed by these sprocket wheels and the said shaft, so that if one carrying wheel drives faster than the other, the faster movement will be communicated to the cross shaft 31. This cross shaft is connected through bevel gearing 32, 33 with the vertical shafts 15 at the rear of the drums or carriers, and as this cross shaft connects one side of the machine with the other, both drums or carriers will be rotated in unison, so that the relation of the picker arms will be maintained at all times, no matter whether the carrying wheels are driving the connections at the same rate of speed or not.

I employ in this machine means for reversing the rotation of the picker spindles for discharging the cotton after being taken from the plant, and for this purpose I provide a reversing rack similar to that disclosed in the application above referred to, and indicated generally at 34, so that after the picker arm passes around the drum at the rear, the gear wheel 23 of this picker arm will engage the reversing rack, and the rotation of the picker spindles will be reversed to discharge the cotton. This reversing rack extends from the rear forward to a point at about 35, and is of straight form. The main rack 24 is of angular form, as shown in plan view in Fig. 2, to follow the angular course of the slats in passing by the central sprocket.

Any one of the slats may be readily removed by lifting it up so that its lower end will clear the cross bar 5 on the lower chain. The slat may then be tilted outwardly at its lower end, and lowered to disengage from the cross bar of the upper chain. This removal of any one of the slats may take place at the end of the reversing rack.

It will be observed that the tracks which sustain the weight of the slats by affording a bearing for the rollers 8 are within the circuit of the slats.

I claim as my invention:

1. In combination in a machine of the class described, a pair of endless drums, one on each side of the longitudinal center of the machine composed of vertically movable slats, said slats being mounted for vertical movement on said chains, upper and lower chains for driving the slats, and cam tracks for giving the slats vertical movement in relation to the chains, said chains moving throughout their course in horizontal planes, substantially as described.

2. In combination in a machine of the class described, an endless drum composed of vertically movable slats bearing cotton picker arms, and means for giving one slat an upward and downward movement and the succeeding slat a reverse movement, substantially as described.

3. In combination in a machine of the class described, a pair of endless drums composed of vertically movable slats with picker arms thereon, and means for giving the slats of one drum an upward and downward movement, and for giving the opposing slats of the other drum a reverse vertical movement, substantially as described.

4. In combination in a machine of the class described, a pair of drums arranged on opposite sides of the longitudinal center of the machine, means for giving certain of the slats of one drum an upward and downward movement as they pass toward the rear, and for giving the other slats of said drum a reverse vertical movement, and means for giving vertical movements to the opposing slats of the other drum in a reverse direction to those of the first drum, substantially as described.

5. In combination in a machine of the class described, carrying chains, slats movable vertically in relation to and connected with the said carrying chains, means for giving the said slats their vertical movements, picker fingers carried by the slats and means for rotating the picker fingers as the slats are moved in relation to the chains, substantially as described.

6. In combination in a machine of the class described, carrying chains, a slat movable vertically thereon, picker arms carried by the slat, a roller connected with the slat, a track inclining one way to an intermediate point in the rearward travel of the carrying chains, and thence inclining the other way to the rear to cause the slat to rise and fall while the picker arm is moving from front to rear in engagement with the cotton plant, picker spindles on the picker arms, and means for rotating the picker spindles as the slats are moved in relation to the chains, substantially as described.

7. In combination in a machine of the class described, a carrying chain having cross bars on its links, said chain moving in a horizontal plane, vertically movable slats engaging the cross bars, picker arms on the slats, and means for moving the slats vertically on the cross bars, substantially as described.

8. In combination in a machine of the class described, a drum having carrying chains with cross bars on the links thereof, said chains moving in a horizontal plane, vertically movable slats of channeled form engaging the said cross bars, and means for moving the slats vertically, substantially as described.

9. In combination an upper and a lower chain, a series of vertically movable slats having picker arms extending horizontally therefrom and mounted thereon, projections on said chains with which the slats have sliding contact, said slats being removable from the said chains, substantially as described.

10. In combination an upper and a lower carrier, a series of slats, projections on said carriers with which the slats engage slidably, said slats having an opening at the top and bottom for the passage of the projection in placing or removing the slat, substantially as described.

11. In combination an upper and a lower chain having projections, a series of vertically movable slats channeled throughout their vertical extent and engaging the said projections, and removable therefrom by a vertical movement of the slats in relation to the said projections, substantially as described.

12. In combination in a cotton picking machine, a series of slats carrying picker devices, carrier means for the slats, a detachable connection between the slats and carrier means consisting of a projection on one and a recess on the other slidably receiving said projection, said slats being detachable from the carriers by sliding them vertically in relation to the carrier means, substantially as described.

13. In combination in a cotton picking machine, a series of slats carrying picker arms, upper and lower carriers to which the slats are connected to be driven thereby, said slats having a vertical sliding connection with the carrier, and a track for supporting the slats to thereby take the weight off of the carriers, substantially as described.

14. In combination in a cotton picking machine, a series of slats each carrying picker arms with a shaft and gearing for driving the pickers, flexible carrier means for driving the slats, and a track for taking the weight of the slats, together with the picker arms and gearing, off of the carriers, said slats having a vertical sliding connection with the carriers, substantially as described.

15. In combination in a cotton picker machine, a series of slats, picker arms, and a shaft and gearing carried by the slats, a chain for driving the slats, said slats having a vertical sliding connection with the chain, and a track within the circuit of the slats with projections on the slats resting on the track to take the weight off of the chain, substantially as described.

In testimony whereof, I affix my signature in presence of two witnesses.

PETER PAUL HARING.

Witnesses:
L. J. LUTENBACHER,
J. C. BURNS.